United States Patent
Zilberberg et al.

(10) Patent No.: US 9,360,661 B2
(45) Date of Patent: Jun. 7, 2016

(54) COVER-SLIPS FOR AN OPTICAL MICROSCOPE AND RELATED METHODS

(71) Applicants: Alona Zilberberg, Tel Aviv (IL); Amir Zilberberg, Tel Aviv (IL)

(72) Inventors: Alona Zilberberg, Tel Aviv (IL); Amir Zilberberg, Tel Aviv (IL)

( * ) Notice: Subject to any disclaimer, the term of this patent is extended or adjusted under 35 U.S.C. 154(b) by 0 days.

(21) Appl. No.: 14/430,222

(22) PCT Filed: Sep. 23, 2013

(86) PCT No.: PCT/IB2013/058761
§ 371 (c)(1),
(2) Date: Mar. 22, 2015

(87) PCT Pub. No.: WO2014/045250
PCT Pub. Date: Mar. 27, 2014

(65) Prior Publication Data
US 2015/0260977 A1    Sep. 17, 2015

Related U.S. Application Data

(60) Provisional application No. 61/704,506, filed on Sep. 23, 2012.

(51) Int. Cl.
*G02B 1/00* (2006.01)
*G02B 21/34* (2006.01)
*B01L 3/00* (2006.01)

(52) U.S. Cl.
CPC ............ *G02B 21/34* (2013.01); *B01L 3/508* (2013.01); *B01L 2200/141* (2013.01); *B01L 2300/043* (2013.01); *B01L 2300/0822* (2013.01)

(58) Field of Classification Search
CPC ... G02B 21/34; B01L 2300/0822; B01L 9/52; G01N 1/312
USPC .................................................. 359/396–398
See application file for complete search history.

(56) References Cited

U.S. PATENT DOCUMENTS

| | | |
|---|---|---|
| 3,879,106 A | 4/1975 | McCormick |
| 4,679,914 A | 7/1987 | Rosenberg |
| 5,784,193 A | 7/1998 | Ferguson |
| 5,812,312 A | 9/1998 | Lorincz |
| 5,866,241 A | 2/1999 | Xiang |
| 6,555,384 B1 | 4/2003 | Angros |
| 2003/0021021 A1* | 1/2003 | Branch .............. G02B 21/34 359/396 |
| 2007/0092408 A1 | 4/2007 | Angros |
| 2010/0047860 A1 | 2/2010 | Fukuoka |

FOREIGN PATENT DOCUMENTS

| | | |
|---|---|---|
| GB | 2482726 | 2/2012 |
| JP | 2005189123 | 7/2005 |
| WO | 2005106423 | 11/2005 |

* cited by examiner

*Primary Examiner* — Euncha Cherry
(74) *Attorney, Agent, or Firm* — Gerald E. Linden

(57) ABSTRACT

A cover-slip suitable for use in examination by an optical microscope. The cover-slip comprises a planar portion of substantially rigid and transparent material and further comprises a tab contiguous with or adjacent to or attached with the planar portion. The tab is divertable from the plane of the planar portion along a predetermined bending region, thereby allowing holding and displacing the cover-slip e.g. when the cover-slip lies on a flat surface.

20 Claims, 6 Drawing Sheets

COVER-SLIPS FOR AN OPTICAL MICROSCOPE AND RELATED METHODS

RELATED APPLICATION DATA

This application is the U.S. National Stage of International Application No. PCT/IB2013/058761 filed Sep. 23, 2013, which claims the benefit of U.S. Provisional Patent Application No. 61/704,506 filed Sep. 23, 2012. Each of the foregoing applications is hereby incorporated by reference in its entirety for all purposes.

TECHNICAL FIELD

The disclosure, in some embodiments, relates to the field of cover-slips usable with an optical microscope.

BACKGROUND

Cover-slips are widely used for assisting and facilitating viewing objects under an optical microscope. A basic usage employs disposing the object to be viewed between a microscope slide and a cover-slip, thereby forming a stack, and placing the stack under the microscope for observation. The stack is arranged under the microscope so that the cover-slip faces the objective lens, typically meaning that the slide is arranged at the bottom of the stack and the cover-slip on top. The slide is typically relatively thick for providing some mechanical strength and stability to the stack and is typically made of a transparent material such as glass, quartz or poly (methyl-methacrylate) (PMMA), for allowing illuminating the viewed object from below. The cover slip must be transparent to allow viewing the viewed object therethrough, and is relatively thin, allowing the use of a short focal length objective. Commercial cover-slips are available in thicknesses ranging from about 0.1 mm to about 0.3 mm, various shapes, such as square, rectangular and circular, and various sizes, such as squares of 18 m*18 mm or 24 mm*24 mm.

Often, cover-slips are used as a platform for microbial culturing. Microbial culturing is used herein in a most general sense, referring to growing any microorganisms including prokaryotic cells and eukaryotic cells. For example, biological cells, bacteria, fungi or cells infected by viruses may be cultured on the surface of the cover-slip under controlled conditions, and then taken, when desired, carried on the cover-slip, for observations using an optical microscope. A typical method for microbial culturing on a cover-slip followed by microscopic observations may include placing the cover-slip in a microwell, e.g. in a microwell plate, so that one surface of the cover-slip which is adapted to assist biological culturing thereon faces upwards towards the microwell opening. Culturing may then be initiated and maintained for a desired period of time whereas the microwell plate with the cover-slip inside is kept under controlled environmental conditions possibly in an incubator. Following the culturing stage, the cover-slip may be taken for observation. The cover-slip may be removed from the microwell e.g. using a specialized tweezers and may further be manipulated, e.g. taken from place to place inside a laboratory or from one laboratory to another or may be operated on, e.g. for preparing the biological matter for microscopic observation. Such preparations may include treating cells to allow fixation to the coversilps, incubation with primary and secondary—fluorophore integrated antibodies. The cover-slip may then be glued to a microscope slide "face down", so that the biological matter cultured on the cover-slip is disposed in between the slide and the cover-slip. Aclar®, Thermanox and Permanox™ are exemplary commercial polymeric materials commonly used for cover-slips suitable for biological culturing.

SUMMARY

Aspects of the disclosure, in some embodiments thereof, relate to cover-slips suitable for use in examination by an optical microscope. More specifically, aspects of the disclosure, in some embodiments thereof, relate to a cover-slip having a tab configured to facilitate holding the cover-slip.

As discussed above, cover-slips often need to be manipulated, namely need to be picked-up, held steadily in one place, taken from place to place and disposed adequately where desired. Often, such manipulation exposes the cover-slip to various risks. Current cover-slips are formed as small planar sheets, having lateral dimensions of a few millimeters to a few centimeters and a thickness of a few tenths of a millimeter. A cover-slip is often difficult to pick up, even when using a dedicated tool such as specialized tweezers, particularly when the cover-slip lies on a flat surface such as a smooth table. An attempt to pick up a cover-slip by contacting it with a sticky tool may result in contaminating the cover-slip with remnants of undesired materials. Cover-slips, particularly if made of glass or quartz, are fragile, and cracking or fracturing the cover-slip may be caused during attempts to pick up a cover-slip or during holding a cover-slip due to unbalanced forces that may be applied. Further, if a cultured specimen carrying cover-slip is accidentally dropped or unintentionally or inattentionally disposed of, it is often difficult to conclude by observation which is the surface on which the biological matter is present. Without knowing which side of the cover-slip actually carries the biological matter, it is impossible to adequately prepare the specimen for observation. It is therefore concluded that without a credible mark indicating the side on which biological matter was cultured, the cover-slip, with the biological matter thereon, are exposed to a substantial risk of being wasted due to accidental loss of track of the identification of the sides of the cover-slip.

Thus, according to an aspect of some embodiments, there is provided a cover-slip suitable for use in examination by an optical microscope. The cover-slip comprises a planar portion of substantially rigid and transparent material and further comprises a tab adjacent to or contiguous with the planar portion. The tab is divertable from the plane of the planar portion along a predetermined bending region, thereby allowing holding and displacing the cover-slip e.g. when the cover-slip lies on a flat surface. The tab being divertable from the plane of the planar portion means herein that the tab may be inflexibly associated with the planar portion so that the tab is diverted from the plane of the planar portion, for example the tab may be inflexibly bent relative to the plane of the planar portion along the predetermined bending region. Alternatively or additionally the tab may be associated with the planar portion so that the tab and the planar portion are on a same plane, and the tab is configured to be diverted from that plane, e.g. the tab may be manually bent relative to the plane of the planar portion along the predetermined bending region, while the tab and the planar portion remain associated together.

According to an aspect of some embodiment there is provided a method of manipulating a cover-slip suitable for use in examination by an optical microscope. The method comprises providing a cover-slip having a planar portion of substantially rigid and transparent material and a tab adjacent to the planar portion and physically associated with the planar portion. The tab is divertable from the plane of the planar portion along a pre-determined bending region. The method further comprises holding the tab when the tab is diverted from the plane of the planar portion, thereby manipulating the cover-slip.

Aspects of some embodiments are further described in the specification hereinbelow and in the appended claims.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, takes precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

BRIEF DESCRIPTION OF THE FIGURES

Some embodiments herein are described with reference to the accompanying figures. The description, together with the figures, makes apparent to a person having ordinary skill in the art how embodiments may be practiced. The figures are for the purpose of illustrative discussion and no attempt is made to show structural details of an embodiment in more detail than is necessary for a fundamental understanding of the teachings herein. For the sake of clarity, some objects depicted in the figures are not to scale.

In the Figures.

DESCRIPTION OF SOME EMBODIMENTS

The principles, uses and implementations of the teachings herein may be better understood with reference to the accompanying description and figures. Upon perusal of the description and figures present herein, one skilled in the art is able to implement the teachings herein without undue effort or experimentation.

Before explaining at least one embodiment in detail, it is to be understood that the disclosure is not necessarily limited in its application to the details of construction and the arrangement of the components and/or methods set forth herein. Other embodiments may be practiced, and an embodiment may be carried out in various ways. The phraseology and terminology employed herein are for descriptive purpose and should not be regarded as limiting.

Figure 1A:
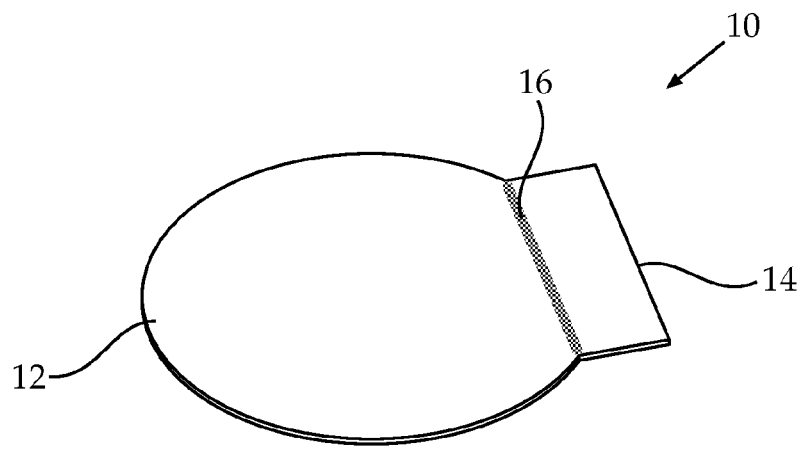
FIG. 1A schematically depicts an embodiment of a cover-slip wherein the tab is in the plane of the planar portion of the cover slip.
Figure 1B:
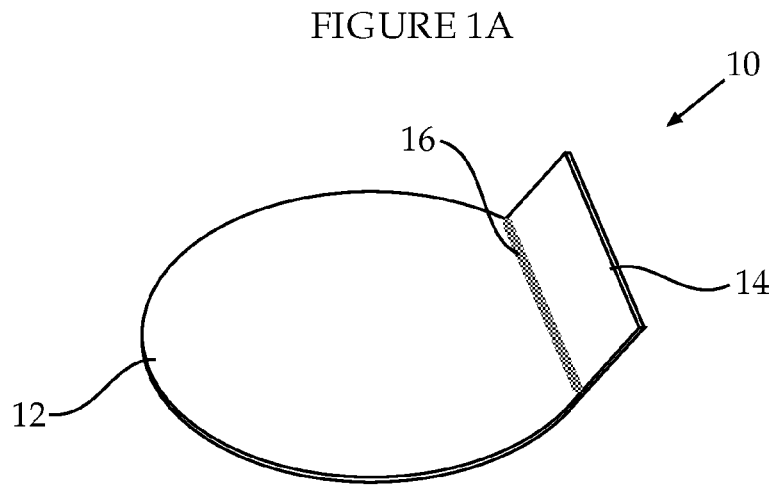
FIG. 1B schematically depicts the cover-slip of FIG. 1A wherein the tab has been diverted from the plane of the planar portion of the cover slip.
Figure 1C:
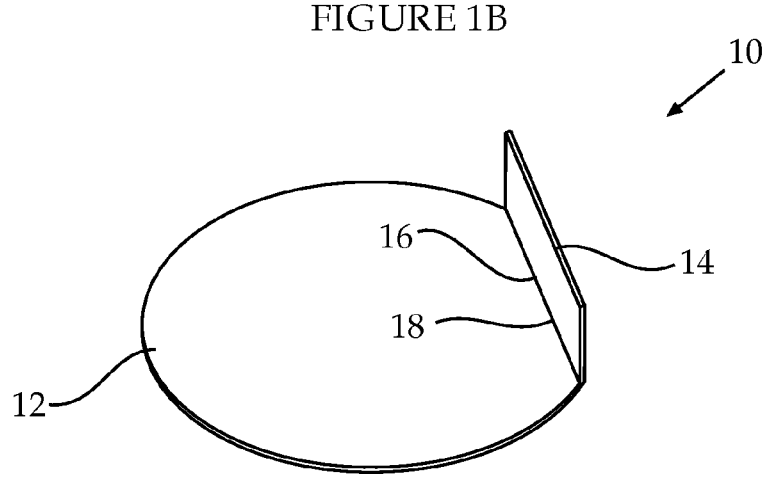
FIG. 1C schematically depicts an embodiment of a cover-slip wherein the tab is inflexibly associated with the planar portion of the cover-slip and is diverted from the plane of the planar portion.

FIGS. 1A-1C schematically depict an embodiment of a cover-slip 10 according to an aspect of the teachings herein. Cover slip 10 comprises a planar portion 12 of a substantially rigid and transparent material such as glass or plastic. Planar portion 12 may in some embodiments be configured for covering an area of a slide examined in an optical microscope. In some embodiments planar portion 12 may be configured for allowing microbial culturing on a surface thereof. In some embodiments a first surface of planar portion 12 may be configured for allowing microbial culturing thereon, and a second surface is not configured for allowing microbial culturing thereon. An exemplary plastic material suitable for use as a transparent planar portion of a cover-slip is ACLAR® or THERMANOX or PERMANOX™.

According to some embodiments, at least one surface of planar portion 12 is hydrophilic. According to some embodiments, the surface is treated to become hydrophilic. In some embodiments cover-slip 10, or planar portion 12, or a surface of the planar portion are treated by an adhesion factor to become hydrophilic. In some embodiments planar portion 12 or a surface thereof is treated by Fibronectin Poly-L-Lysine (PLL)/Poly-D-Lysine (PDL) or Collagen IV or by an agent that is known in the art to enable cell adhesion.

According to some embodiments, at least one surface of planar portion 12 is solvent Resistant. Solvent resistant herein means that planar portion 12 is substantially unaffected by an exposure to at least one solvent. According to some embodiments cover-slip 10, or planar portion 12 are resistant to at least one alcohol (e.g., Methanol, Ethanol), are resistant to aldehydes, hydrocarbons, dilute acids (<10%) or dilute alkalis (<2%). According to some embodiments cover-slip 10, or planar portion 12 are resistant to xylene, toluene, Acetone, Acetic acid, weak detergent (e.g., Triton X-100, NP-40), Acetone (propanone), Paraformaldehyde (~4-10%), salts (KCL, NaCl, Na2HPO4, KH2PO4), glycerol, p-phenylenediamine, propyl gallate or 1,4-Diazabicyclo (2,2,2)-octane (DABCO).

According to some embodiments, planar portion 12 exhibits low autofluorescence. According to some embodiments planar portion 12 can withstand autoclaving substantially without being affected. According to some embodiments planar portion 12 can withstand autoclaving by steam for at least about 20 minutes, and drying at at least about 120° C. for at least about 20 minutes. According to some embodiments, planar portion 12 exhibits a very low vapor/gas permeability.

Rigid herein means that planar portion 12 is not soft and may not spontaneously fold or crumple. In some embodiments, such as embodiments comprising some polymeric materials, planar portion 12 may be flexible in addition to being rigid. In some embodiments planar portion 12 may twist or bend or break when subject to force applied by fingers. If no force or pressure is applied, planar portion 12 remains substantially planar. In some embodiments, such as embodiments comprising glass, planar portion 12 may be substantially inflexible.

Cover-slip 10 further comprises a tab 14 contiguous with planar portion 12. Tab 14 is divertable from the plane of planar portion 12, along a pre-determined bending region 16. In some embodiments tab 14 is in plane with planar portion 12, meaning that tab 14 is substantially included in the geometric plane defined by planar portion 12, and is configured to subsequently be diverted from the plane of planar portion 12 by applying a force on tab 14, e.g. by hand. For example, tab 14 may be bent relative to planar portion 12 along predetermined bending region 16, as is schematically depicted in FIG. 1B. In some embodiments tab 14 is diverted from the plane of planar portion 12. In some embodiments, tab 14 is inflexibly associated with planar portion 12 in a diverted orientation from the plane of planar portion 12, as is schematically depicted in FIG. 1C.

In some embodiments predetermined bending region 16 is configured to facilitate bending of tab 14 relative to planar portion 12. Predetermined bending region 16 may include for example a section associating tab 14 and planar portion 12 which is thinner or weaker—namely less resistant to bending—than the surrounding of predetermined bending region 16, thereby facilitating bending along the thin or weak region. As another example, predetermined bending region 16 may include a soft or flexible material used for associating tab 14 to planar portion 12. According to another example predetermined bending region 16 may include perforation arranged substantially along a line, configured to facilitate bending along the line. According to some exemplary embodiments, planar section 12 and tab 14 may be integrally formed by being manufactured from a same sheet of rigid and transparent plastic, whereas pre-determined bending region 16, configured to facilitate bending of tab 14 relative to planar section 12 as described above, associates tab 14 and planar section 12. According to some embodiments tab 14 may be plastically bent relative to planar portion 12 along predetermined bending region 16, meaning that the bending is substantially irreversible. According to some embodiments tab 14 may be elastically bent relative to planar portion 12 along predetermined bending region 16, meaning that the bending is substantially reversible, so that when the bending force ceases, tab 14 returns to be substantially in plane with planar portion 12.

Predetermined bending region 16 may in some embodiments include a bent section associating planar portion 12 and tab 14. In some embodiments the bent section of predetermined bending region 16 may be substantially inflexible. For example, cover-slip 10 may in some embodiments comprise a glass planar portion 12 and a glass tab 14 associated together at an angle so that tab 14 is inflexibly diverted from the plane of planar portion 12. According to some embodiments planar portion 12 and tab 14 may be integrally formed by being manufactured from a single sheet of glass and may further be bent in the manufacturing process relative to one another. According to some embodiments planar portion 12 and tab 14 may be manufactured from two separate sheets of glass and may then be bonded together at an angle. According to some embodiments an obtained cover-slip 10 comprises a planar portion 12 and tab 14 associated together by a bent section along predetermined bending region 16, as is schematically depicted in FIG. 1C.

In Some embodiments cover-slip 10 comprises a fracture region 18 configured to facilitate detaching tab 14 from planar portion 12, by breaking cover-slip 10 substantially along fracture region 18.

Figure 2A:
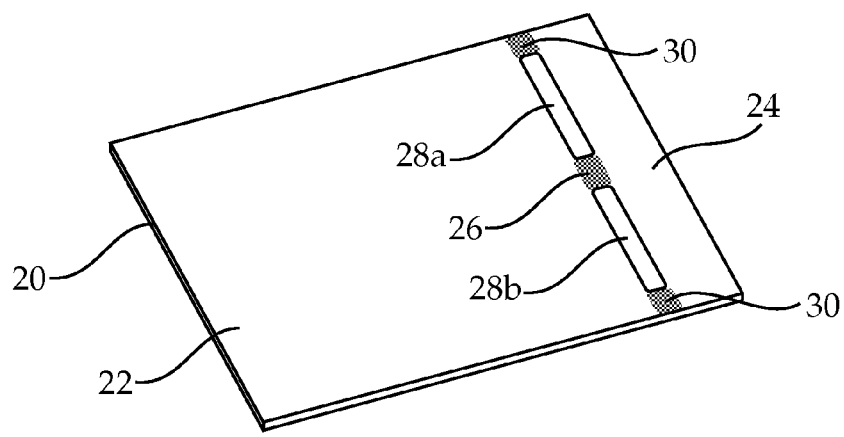
FIG. 2A schematically depicts an embodiment of a rectangular cover-slip with a bending region predetermined by slits.
Figure 2B:
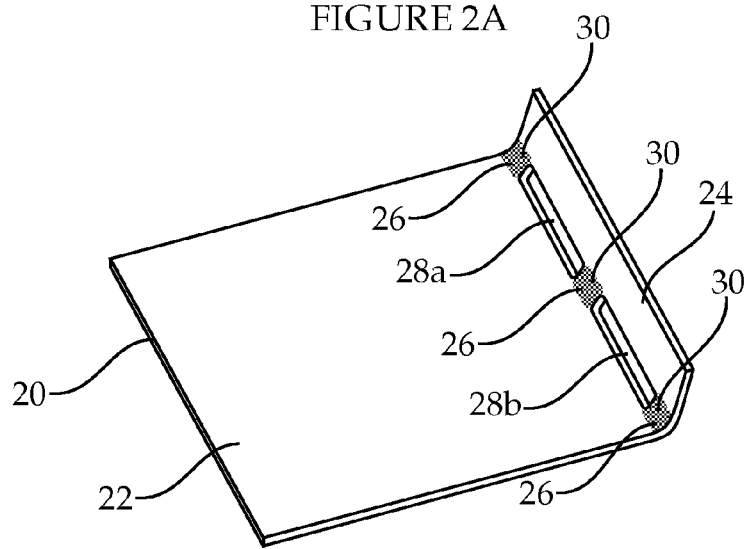
FIG. 2B schematically depicts the cover-slip of FIG. 2A wherein the tab has been bent along the pre-determined bending region.
Figure 2C:
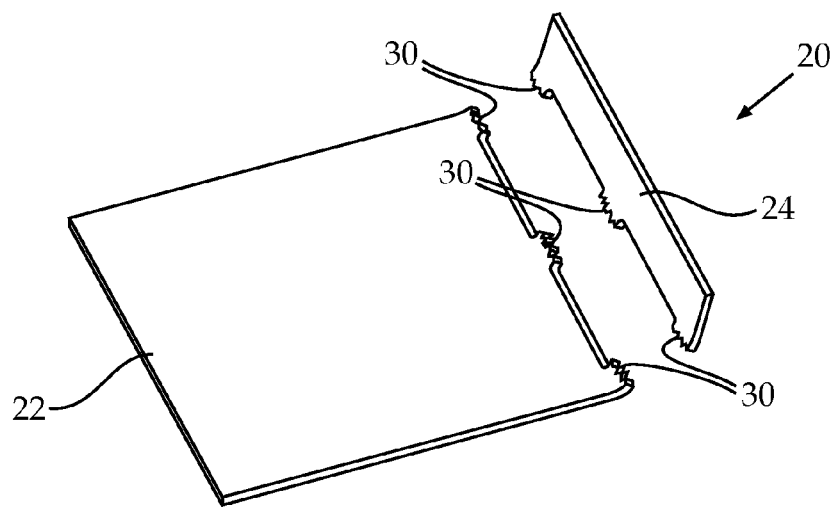
FIG. 2C schematically depicts the cover-slip of FIG. 2A wherein the tab has been detached from the planar portion along a fracture region.

FIGS. 2A-2C schematically depict an embodiment of a cover-slip 20 according to an aspect of the teachings herein. Cover slip 20 comprises a planar portion 22 and a tab 24 adjacent to planar portion 22. Planar portion 22 and tab 24 are integrally formed from a rigid and transparent sheet of polymer, e.g. Aclar®. A predetermined bending region 26 is predefined substantially between planar portion 22 and tab 24 by slits 28a and 28b arranged in line with predetermined bending region 26 and configured to weaken the plastic sheet along predetermined bending region 26 thereby facilitating bending the sheet. Cover-slip 20 may be manufactured using any technique known in the art for processing a rigid and transparent sheet of plastic into a desired form. For example, laser cutting may be employed for cutting cover slip 20 from a larger sheet of a desired width along a desired layout of the cover-slip, and for forming slits 28a and 28b.

Before use, a user may bend tab 24 relative to planar portion 22, e.g. by hand. When bent by a large enough angle such as about 30 degrees or by about 60 degrees or even by about 90 degrees, tab 24 bents plastically relative to planar portion 22, and may remain bent even when the bending force ceases, as is schematically depicted in FIG. 2B.

For use, a user may pick up, hold and displace cover-slip 20 by gripping or grasping grasping tab 24, even when planar portion 22 lies on a flat surface. Exemplary methods of use of a cover-slip such as cover-slip 20 according to aspects of some embodiments thereof are explained and detailed herein below.

Cover slip 20 further comprises a fracture region 30 substantially overlapping with predetermined bending region 26. Fracture region 30 is configured to facilitate detaching by a user tab 24 from planar portion 22. A user may bend tab 24 several times back and forth relative to planar portion 22 until the plastic sheet breaks along the bending line, substantially along fracture region 30, thereby detaching tab 24 from planar portion 22 as is schematically depicted in FIG. 2C. Some exemplary methods of use detailed below further explain the use of detaching the tab of the cover slip from the planar portion thereof.

Figure 3A:
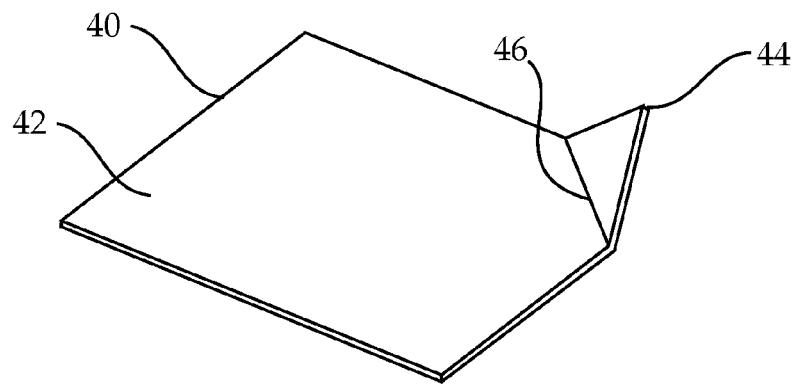
FIG. 3A schematically depicts in a perspective view an embodiment of a cover-slip wherein the tab is inflexibly associated with the planar portion.
Figure 3B:
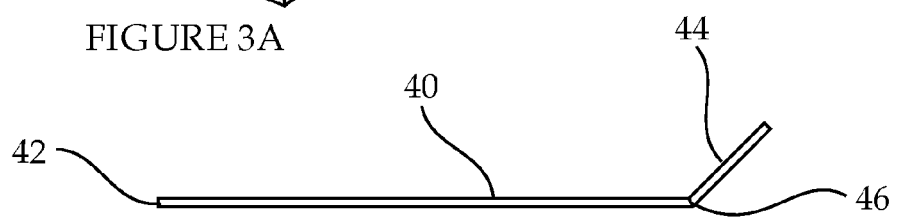
FIG. 3B schematically depicts in side view the cover-slip of FIG. 3A.

FIGS. 3A and 3B schematically depict an embodiment of a cover-slip 40 in perspective view and in side view, respectively. Cover-slip 40 comprises a planar portion 42 and an adjacent tab 44, bent relative to planar portion 42 along a pre-determined bending region 46. Cover-slip 40 is integrally formed from a single sheet of glass or an inflexible polymer, having a substantially rectangular layout whereas tab 44 is diverted from the plane of planar portion 42 by bending a corner of the rectangle sheet of cover-slip 40 relative to planar portion 42, as is schematically depicted in FIG. 3B. Being made of a single sheet of glass, tab 44 and planar portion 42 are inflexibly bent relative to each other, and cover-slip 40 may not be substantially twisted or deformed by a user without being broken.

Figure 4A:
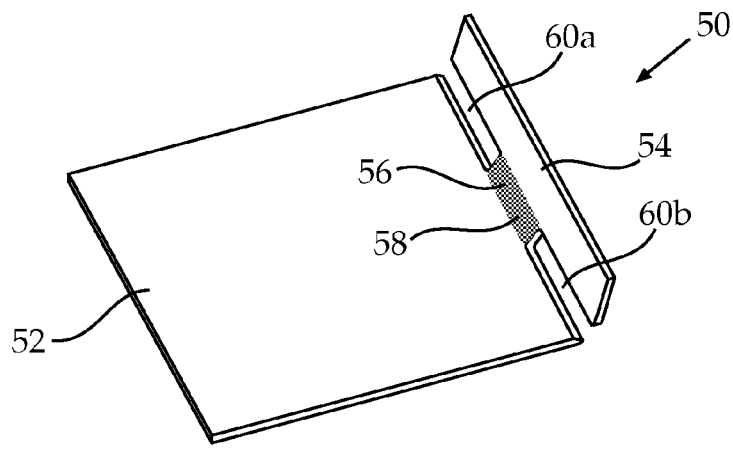
FIG. 4A schematically depicts in a perspective view an embodiment of a cover-slip wherein the tab is inflexibly associated with the planar portion.
Figure 4B:
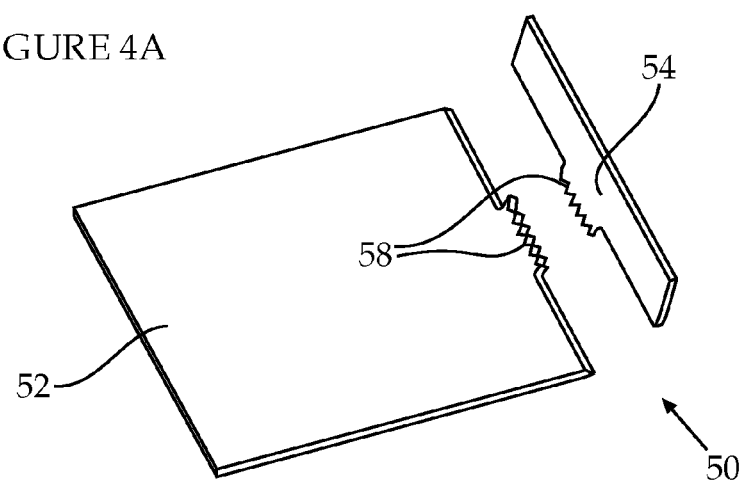
FIG. 4B schematically depicts in side view the cover-slip of FIG. 4A wherein the tab has been detached from the planar portion along a fracture region.

FIGS. 4A and 4B schematically depict an embodiment of a cover-slip 50, comprising a planar portion 52 and a tab 54, bent relative to planar portion 52 along a pre-determined bending region 56. Cover-slip 50 is integrally formed from a single sheet of glass, having a substantially rectangular layout whereas tab 54 is diverted from the plane of planar portion 52 by bending a rectangular section of the rectangle sheet of cover-slip 50 relative to planar portion 52. Cover-slip 50 further comprises a fracture region 58 overlapping with pre-determined bending region 56 and defined by two open slits 60a and 60b. Open slits 60a and 60b are aligned along a line stretching from one edge of the sheet of cover-slip 50 to another edge thereof, each open slit being open towards one edge of the sheet, thereby substantially narrowing the section that associates planar portion 52 with tab 54. When desired, and as is further explained and detailed herein below, a user may detach tab 54 from planar portion 52 by breaking cover-slip 50 along fracture region 58, as is schematically depicted in FIG. 4B.

Figure 5:
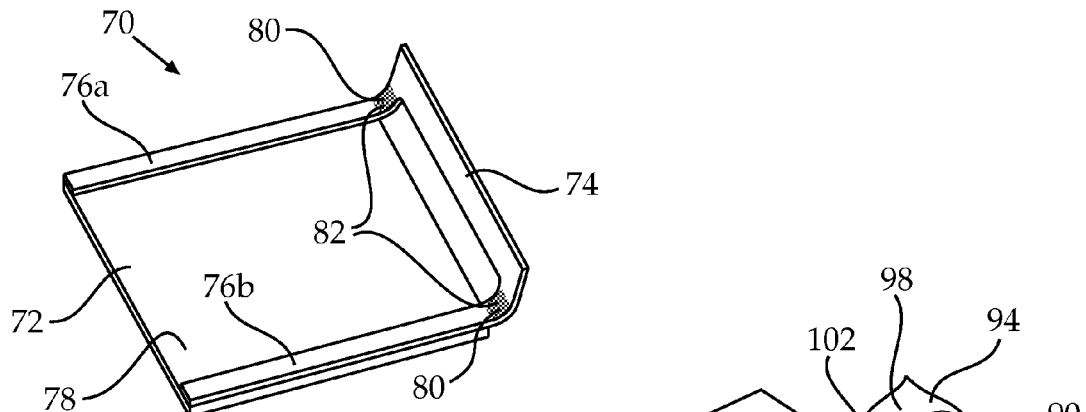
FIG. 5 schematically depicts an embodiment of a cover-slip wherein the tab is attached to the planar portion.

FIG. 5 schematically depicts an embodiment of a cover-slip 70 comprising a planar portion 72 made of glass or an inflexible polymer and a tab 74, also made of glass. Tab 74 is disposed adjacent to planar portion 72 and is attached to planar portion 72 by two arms 76a and 76b. Arms 76a and 76b are integrally and contiguously formed with tab 74 and are attached to an upper surface 78 of planar portion 72 e.g. by boding. Other embodiments, comprising arms employed to associate tab 74 to planar portion 72 and are attached to a bottom surface (not shown) of planar portion 72 are contemplated. Alternatively or additionally, arms 76a and 76b may not be integrally formed with tab 74, and may be attached according to some embodiments to a surface of tab 74, e.g. by boding. Arms 76a and 76b are bent proximal to tab 74, thereby defining a pre-determined bending region 80, inflexibly diverting tab 74 from the plane of planar portion 72. Cover-slip 70 further comprises a fracture region 82, substantially overlapping with pre-determined bending region 80 and configured to facilitate detaching tab 74 from planar portion 72 by breaking cover-slip 70 substantially along fracture region 82. It should be understood that arms 76a and 76b are weakest at about fracture region 82 because at about fracture region 82 arms 76a and 76b are not bonded to planar portion 72. Thus, when desired, a user may detach tab 74 from planar portion 72 by breaking cover-slip 70 along fracture region 82.

Figure 6A:
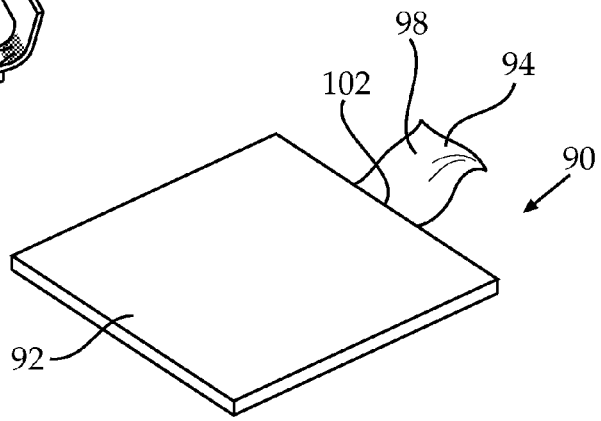
FIG. 6A schematically depicts an embodiment of a cover-slip comprising a planar portion and a foldable tab stuck to a surface of the planar portion.
Figure 6B:
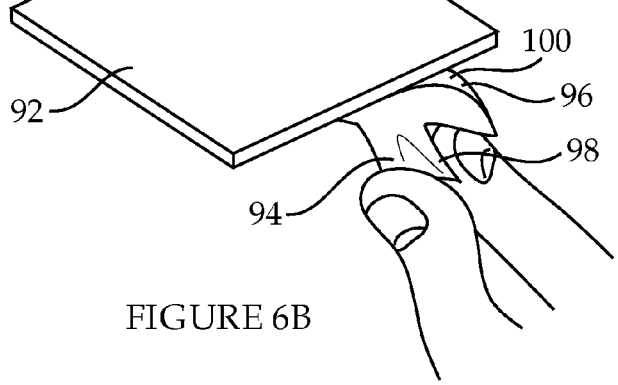
FIG. 6B schematically depicts the cover-slip of FIG. 6A, wherein the tab is being detached from the planar portion in a pealing-like effect.
Figure 6C:
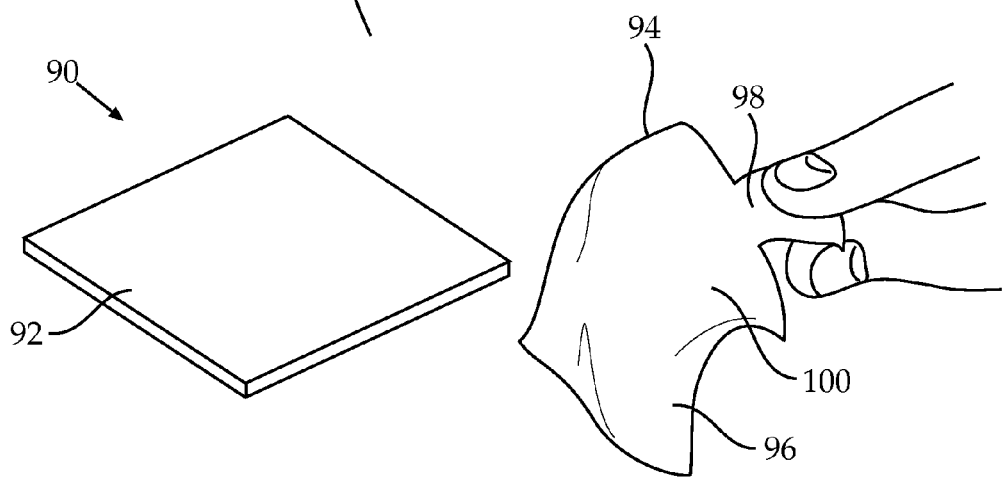
FIG. 6C schematically depicts the cover-slip of FIG. 6A, wherein the tab has been detached from the planar portion.

FIGS. 6A-6C schematically depict an embodiment of a cover-slip 90 according to the teachings herein. Cover-slip 90 comprises a planar portion 92 and a foldable tape 94. Foldable tape 94 comprises a sticky portion 96 and a tab portion 98. Sticky portion 96 is configured to stick to a bottom surface (not shown) of planar portion 92 along a fracture region 100, so that tab portion 98 extends out of the external layout of planar portion 92, as is schematically depicted in FIG. 6A. Further, tab portion 98 is foldable, thereby being divertable from the plane of planar portion 92 along pre-determined bending region 102, i.e. along the edge of planar portion 92 proximal to tab portion 98. Folding tab portion 98 may allow a user to grip and to hold tab portion 98 and displace cover-slip 90, substantially without touching planar portion 92.

In use, tab portion 98, together with foldable tape 94 may be detached from planar portion 92 by pulling tab portion 98 downwards relative to planar portion 92 as is schematically depicted in FIG. 6B. Foldable tape 94 may then depart from planar portion 92 in a pealing-like effect along fracture region 100, until foldable tape 94 detaches entirely from planar portion 92, as is schematically depicted in FIG. 6C.

Cover-slips according to the teachings herein may be employed and used in a variety of ways and methods. According to some embodiments a cover slip may be provided having a planar portion of substantially rigid and transparent material and a tab adjacent to the planar portion and physically associated with the planar portion as is schematically depicted for example in FIGS. 1A-1C. In some embodiments, comprising for example a rigid and flexible material such as a polymeric material, the tab may be disposed in the plane of the planar portion as is depicted for example in FIG. 1A, and may be diverted by a user from the plane of the planar portion along a pre-determined bending region, as is schematically depicted in FIG. 1B. In some embodiments, comprising for example a rigid and flexible material, or in embodiments comprising for example a rigid and inflexible material, the tab may be disposed in a plane diverted from the plane of the planar portion along a pre-determined bending region, as is schematically depicted in FIG. 1C. According to some embodiments, a user may grip or grasp or hold the tab, and thereby manipulate the cover-slip, e.g. by displacing the cover-slip from place to place. In some embodiments, by holding the tab the user can manipulate the cover-slip without contacting the planar portion thereof, thereby eliminating risk of contaminating the surface thereof. According to some embodiments, the tab allows a user to obtain a grip of the cover-slip easily and directly even when the planar portion thereof lies on a flat surface such as a smooth table. In some embodiments the tab is configured for allowing a user to hold and to displace the cover slip, thereby avoiding contacting the planar portion and avoiding consequent risk of involuntarily damaging or scratching or breaking the cover-slip.

Figure 7A:
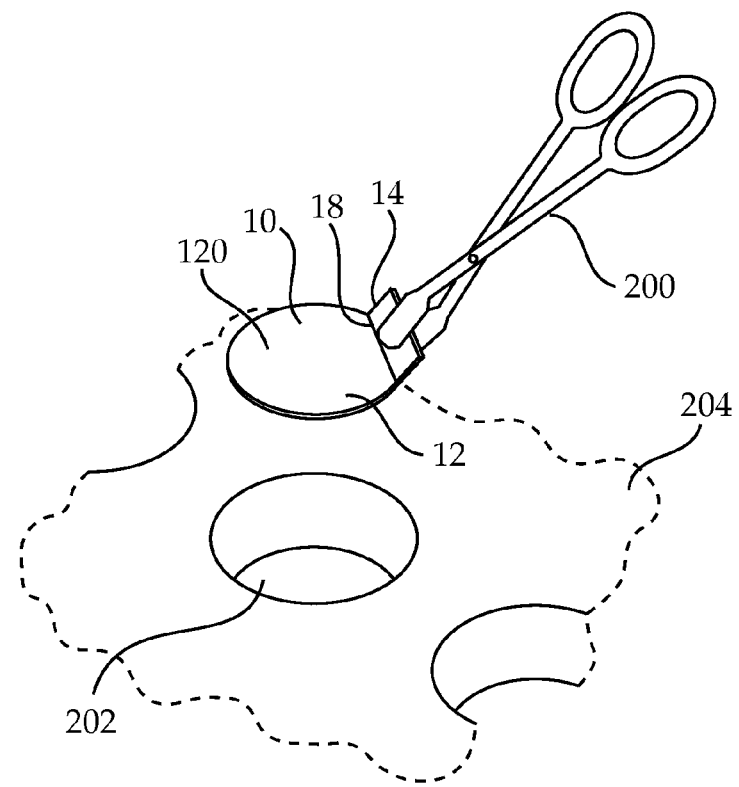
FIG. 7A schematically depicts a set of forceps holding an embodiment of a cover-slip by gripping the cover-slip's tab.

FIGS. 7A-7D schematically illustrate steps of a method of using a cover-slip according to an aspect of some embodiments. In FIG. 7A a cover-slip 10 according to the teachings herein is held by a set of forceps 200. Forceps 200 hold tab 14 of cover-slip 10, thereby allowing a user holding and manipulating cover-slip 10 substantially without contacting planar portion 12. Using forceps 200, a user may place cover-slip in a microwell such as microwell 202 in multi-well plate 204. According to some embodiments cover-slip 10 comprises a top surface 120 configured for facilitating microbial culturing thereon. According to some embodiments, tab 14 is diverted towards top surface 120, thereby indicating for a user on top surface 120, even if cove-slip 10 is later unintentionally or inattentionally disposed of and the user may not otherwise know which surface of planar portion 10 was top surface 120.

Figure 7B:
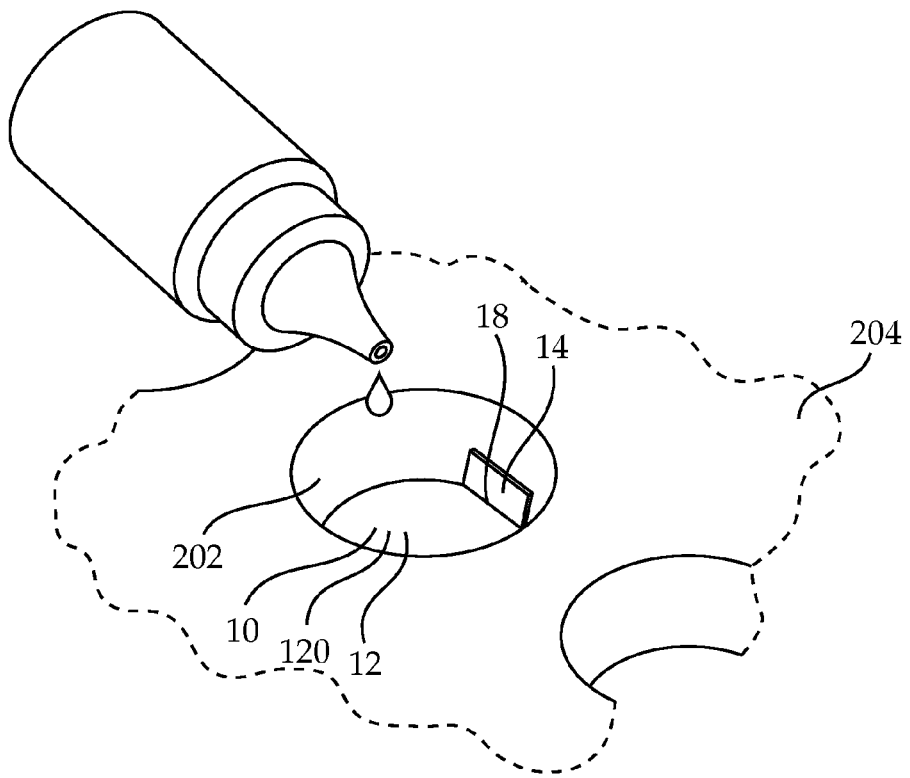
FIG. 7B schematically depicts the cover-slip of FIG. 7A inside a microwell.

FIG. 7B illustrates schematically cover-slip 10 disposed in microwell 202 for inoculation and culturing biological matter on top surface 120. It should be understood that microbial culturing on top surface 120 as is schematically illustrated in FIG. 7B may be accomplished using any suitable platform instead of microwell 202, for example a Petri plate, or a microplate or a culture plate or a growing plate, as is well known in the art. Following inoculation cells may be fixed in some embodiments by agents such as formalin, Acetone and methanol. Further, cells may be treated to permeable cell membrane, using detergents such as for example 0.1% of NP-40 or Triton x-100.

Figure 7C:
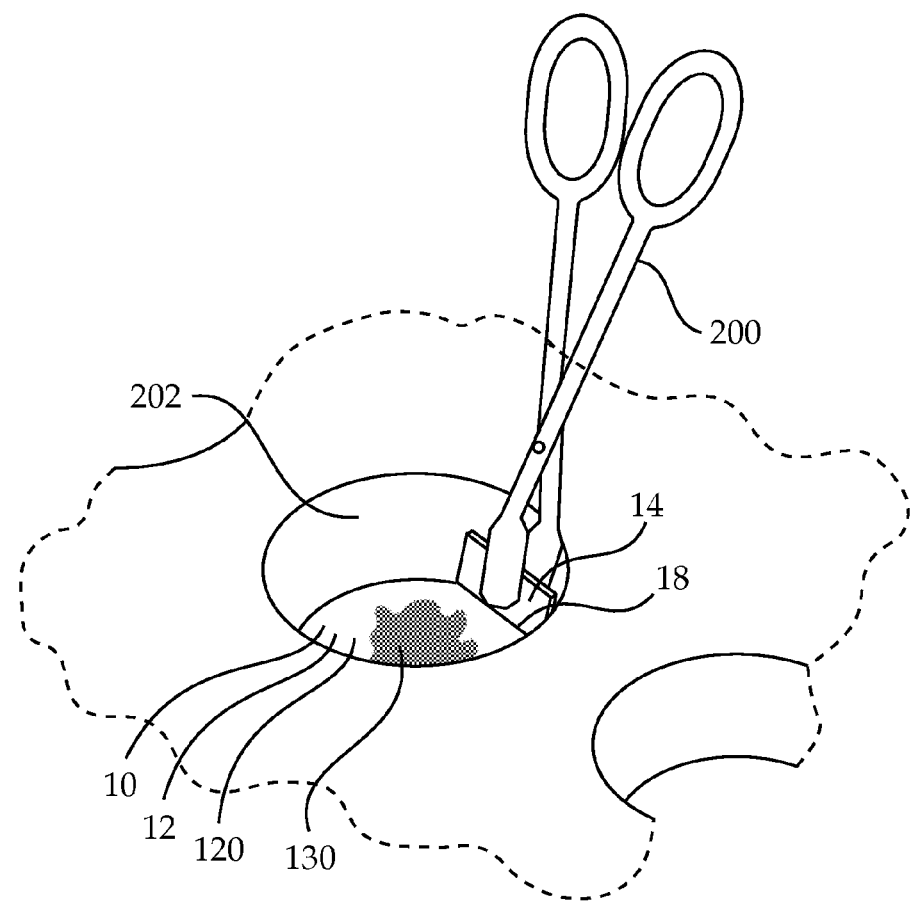
FIG. 7C schematically depicts the cover-slip of FIG. 7A being removed from a microwell using forceps.

FIG. 7C schematically illustrates cover-slip 10 inside microwell 202 following microbial culturing. A biological matter 130 such as, for example, bacteria colony, has been cultured on top surface 120, and has possibly been further processed for investigation. By gripping tab 14, possibly using forceps 200, cover-slip 10 may be removed out from microplate 202 and moved to a different location as desired, without contacting top surface 120 and without damaging planar portion 12. Cover-slip 10 may be taken for carrying out a further step in processing biological matter 130 thereon, or cover-slip 10 may be taken for observation in an optical microscope.

Figure 7D:
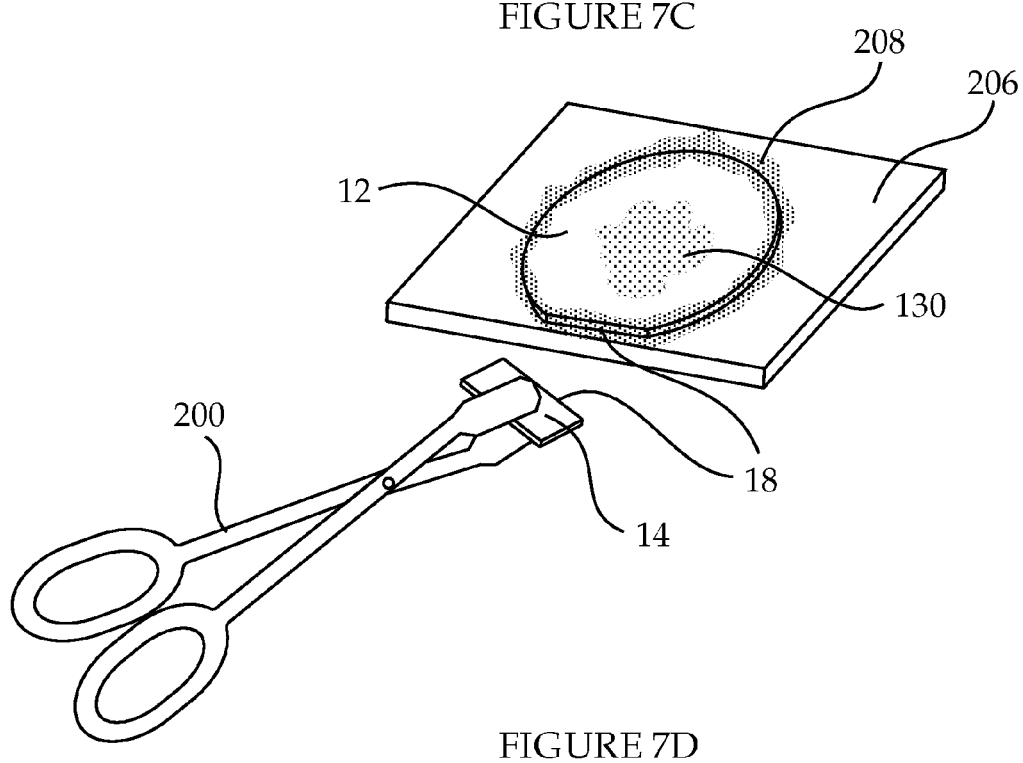
FIG. 7D schematically depicts the planar portion of the cover-slip of FIG. 7A glued to a microscope slide after the tab has been detached from the planar portion.

FIG. 7D schematically illustrate cover-slip 10 positioned on a microscope slide 206 for examination in a microscope, e.g. an optical microscope or a confocal microscope or an electron microscope. According to some embodiments cover-slip 10 may be positioned on slide 206 "face down" namely top surface 120 faces downwards towards slide 206, so that biological matter 130 is sandwiched in between slide 206 and top surface 120. When cover-slip 10 is positioned face down on slide 206, tab 14 is oriented downwards. Tab 14 may be detached from planar portion 12, to allow adequate placement of planar portion 12 on slide 206, so that top surface 120 is substantially parallel to the surface of slide 206. In some embodiments, tab 14 may be detached from planar portion 12 by breaking cover-slip 10 along a fracture region 18, as is described and explained above. A glue 208 may be used to glue planar portion 12 to slide 206 and possibly to seal off the volume trapped between slide 206 and top surface 120, including biological matter 130 therein, from undesired external influences.

In some embodiments of cover-slip 10 wherein tab 14 is flexibly or plastically attached to planar portion 12—for example (but not limited to) embodiments wherein tab 14 and planar portion 12 are integrally formed from a polymer material—tab 14 may be configured to be bent towards both surfaces of planar portion 12, at the user's desire. For example, cover-slip 10 may be positioned, in one step, inside microwell 202 as is schematically depicted in FIG. 7B, so that first surface 120 and tab 14 face upwards. In a subsequent step cover-slip 10 may be taken out from microwell 202 and may be placed in another microwell or in a different plate for a subsequent step of processing biological material, so that first surface 120 faces downwards, and tab 14 faces upwards. Thus, before placing cover-slip 10 in microwell 202, the user may bend tab 14 towards first surface 120, and before placing cover-slip 10 in a new plate the user may bend tab 14 towards the other surface. In some embodiments tab 14 may be so bent back and forth several times without being broken and without being departed from planar portion 12.

According to some embodiments tab 14 may be colored. According to some embodiments tab coloring may be used for coding cover-slips and/or for identifying cover-slips. For example, a multitude of cover-slips may be provided wherein the cover-slips are grouped into groups, and cover-slips in each group have tabs colored by a color unique to the group. Colored tab may thereby be used for identifying a cover-slip as belonging to a specific group within the multitude of cover-slips, and may thereby facilitate maintaining categorization and order, e.g. in an experiments involved with many cover-slips. For example, a specific cover-slip in a multi-well plate may be distinctly identified just by the color of the tab, by using in the multi-well plate cover-slips wherein each has a tab with a distinct color.

Thus, according to an aspect of some embodiments, there is provided a cover-slip (10) suitable for use in examination by an optical microscope. The cover-slip comprises a planar portion (12) of substantially rigid and transparent material and a tab (14) contiguous with the planar portion and physically associated with the planar portion. The tab is divertable from the plane of the planar portion along a predetermined bending region (16). The tab is thereby configured to facilitate holding and displacing the cover-slip.

In some embodiments the tab (74) is adjacent to the planar portion (72). In some embodiments the tab (44) is contiguous with the planar portion (42). In some embodiments the tab (74, 98) is attached to the planar portion (72, 92).

According to some embodiments the tab (24, 98) is flexibly associated with the planar portion (22, 92). According to some embodiments the tab is substantially in plane with the planar portion, being configured to be flexibly diverted from the plane along the predetermined bending region (26, 102), for facilitating holding and displacing the cover-slip. According to some embodiments the tab is configured to be diverted by manual manipulation. According to some embodiments the tab is configured to be diverted by a robot or a machine. According to some embodiments the tab is substantially diverted from the plane of the planar portion along the predetermined bending region, thereby facilitating holding and displacing the cover-slip.

According to some embodiments the tab (24) is plastically associated with the planar portion (22). According to some embodiments the tab is substantially in plane with the planar portion, being configured to be diverted from the plane along the predetermined bending region for facilitating holding and displacing the cover-slip. According to some embodiments the tab is configured to be diverted by manual manipulation. According to some embodiments the tab is configured to be diverted by a robot or a machine. According to some embodiments the tab is substantially diverted from the plane of the planar portion along the predetermined bending region, thereby facilitating holding and displacing the cover-slip.

According to some embodiments the tab (14 FIG. 1C, 44, 54) is inflexibly associated with the planar portion (12 FIG. 1C, 42, 52), being diverted from the plane of the planar portion along the predetermined bending region.

According to some embodiments the cover-slip (10, 20, 50, 70, 90) comprises a fracture region (18, 30, 58, 82, 100) between the planar portion (12, 22, 52, 72, 92) and the tab (14, 24, 54, 74, 98), allowing detaching the tab from the planar portion along the fracture region. According to some embodiments the fracture region (18, 30, 58, 82) allows detaching the tab from the planar portion by allowing controllably breaking the cover-slip along the fracture region. According to some embodiments the cover-slip (10, 20, 50, 70) is configured to be controllably broken by bending the tab relative to the planar portion along the fracture region. According to some embodiments cover-slip (20) is configured to be controllably broken by bending the tab relative to the planar portion along the fracture region back and forth. According to some embodiments fracture region (100) comprises a surface along which the tab is stuck or glued to the planar portion and detaching the tab from the planar portion is accomplished by separating the tab from the planar portion along the surface.

According to some embodiments tab (14) is bent relative to the plane of the planar portion along the predetermined bending region. According to some embodiments tab is bent relative to the plane of the planar portion at an angle greater than zero and smaller than about 10 degrees. According to some embodiments tab is bent relative to the plane of the planar portion at an angle greater than about 10 degrees. According to some embodiments tab is bent relative to the plane of the planar portion at an angle greater than about 30 degrees. According to some embodiments tab is bent relative to the plane of the planar portion at an angle greater than about 60 degrees. According to some embodiments tab is bent relative to the plane of the planar portion at an angle equal to about 90 degrees.

According to some embodiments planar portion (22) and the tab (24) are integrally formed. According to some embodiments tab (74) is attached to the planar portion (72). According to some embodiments the planar portion (52, 92) is made of glass. According to some embodiments planar portion (22) is made of a polymeric material. According to some embodiments tab (24, 98) is made of a polymeric material. According to some embodiments planar portion (22, 52) and the tab (24, 54) are formed from a same sheet of raw material. According to some embodiments raw material is selected form the group consisting of Aclar®, Thermanox and Permanox™. According to some embodiments tab is made of glass. According to some embodiments planar portion (72) and the tab (74) are formed separately and are bonded together in manufacturing the cover-slip. According to some embodiments planar portion and the tab are formed together from a same sheet of raw material.

According to some embodiments the planar portions thickness is between about 0.05 mm and about 1 mm. According to some embodiments the planar portion's thickness is between about 0.1 mm and about 0.3 mm According to some embodiments the planar portions surface area is between about 0.1 cm2 and about 10 cm2. According to some embodiments the planar portions surface area is between about 1 cm2 and about 6 cm2.

According to some embodiments the planar portion (12) comprises a first surface (120) adequate for microbial culturing thereon. According to some embodiments the tab (14) is diverted from the plane of the planar portion (12) towards the first surface (120) thereby indicating for a user on the first surface (120). According to some embodiments the tab is configured to be diverted from the plane of the planar portion towards the first surface and towards an opposite surface of the planar portion.

According to some embodiments the tab is colored. According to some embodiments there is provided a multitude of the cover-slips wherein at least two cover-slips have tabs colored by different colors.

According to an aspect of some embodiments there is provided a method of manipulating a cover-slip suitable for use in examination by an optical microscope. The method comprises providing a cover-slip having a planar portion of substantially rigid and transparent material and a tab adjacent to or contiguous with the planar portion. The tab is physically associated with the planar portion, and the tab is divertable from the plane of the planar portion along a pre-determined bending region. The method further comprises holding the tab when the tab is diverted from the plane of the planar portion, thereby manipulating the cover-slip.

According to some embodiments the tab is diverted by being bent, and the method comprises disposing the cover-slip in a plate for microbial culturing, whereas the tab is bended towards the opening of the plate. According to some embodiments the method further comprises disposing the cover-slip on a microscope slide whereas the tab is bended downwards. According to some embodiments the cover-slip further comprises a fracture region between the planar portion and the tab, and the method comprises detaching the tab from the planar portion by controllably breaking the cover-slip along the fracture region.

It is appreciated that certain aspects of some embodiments, which are, for clarity, described in the context of separate embodiments, may also be provided in combination in a single embodiment. Conversely, various aspects, which are, for brevity, described in the context of a single embodiment, may also be provided separately or in any suitable subcombination or as suitable in any other described embodiment. Elements described in the context of an embodiment are not to be considered essential elements of that embodiment, unless the embodiment is inoperative without those elements.

Although the disclosure describes specific embodiments, alternatives, modifications and variations are apparent to those skilled in the art. Accordingly, the disclosure is intended to embrace all such alternatives, modifications and variations that fall within the scope of the appended claims.

Citation or identification of any reference in this application shall not be construed as an admission that such reference is available as prior art to the disclosure.

Section headings are used herein to ease understanding of the specification and should not be construed as necessarily limiting.

The invention claimed is:

1. A cover-slip suitable for use in examination by an optical microscope, the cover-slip comprising:
   a planar portion of substantially rigid and transparent material; and
   a tab contiguous with or adjacent to said planar portion and physically associated with said planar portion, said tab being divertable from said plane of said planar portion along a predetermined bending region, said tab being configured to facilitate holding and displacing the cover-slip;
   further comprising a fracture region between said planar portion and said tab, allowing detaching said tab from said planar portion along said fracture region.

2. The cover-slip of claim 1 wherein said tab is flexibly or plastically associated with said planar portion.

3. The cover-slip of claim 2 wherein said tab is substantially in plane with said planar portion, being configured to be flexibly diverted from said plane along said predetermined bending region, for facilitating holding and displacing the cover-slip.

4. The cover-slip of claim 3 wherein said tab is configured to be diverted by manual manipulation or by a robot or by a machine.

5. The cover-slip of claim 1 wherein said tab is inflexibly associated with said planar portion, being diverted from said plane of said planar portion along said predetermined bending region.

6. The cover-slip of claim 1 wherein said fracture region allows detaching said tab from said planar portion by allowing controllably breaking the cover-slip along said fracture region by bending said tab relative to said planar portion along said fracture region.

7. The cover-slip of claim 1 wherein said fracture region comprises a surface along which said tab is stuck or glued to said planar portion and detaching said tab from said planar portion is accomplished by separating said tab from said planar portion along said surface.

8. The cover-slip of claim 1 wherein said tab is bent relative to said plane of said planar portion along said predetermined bending region.

9. The cover-slip of claim 8 wherein said tab is bent relative to said plane of said planar portion at an angle greater than about 10 degrees.

10. The cover-slip of claim 1 wherein said planar portion and said tab are integrally formed.

11. The cover-slip of claim 1 wherein said tab is attached to said planar portion.

12. The cover-slip of claim 1 wherein said planar portion is made of glass or of a polymeric material.

13. The cover-slip of claim 12 wherein said planar portion and said tab are formed from a same sheet of raw material.

14. The cover-slip of claim 1 wherein said planar portion comprises a first surface adequate for microbial culturing thereon.

15. The cover-slip of claim 14 wherein said tab is diverted from said plane of said planar portion towards said first surface thereby indicating for a user on said first surface.

16. The cover-slip of claim 1 wherein said tab is colored.

17. A multitude of the cover-slips of claim 16 wherein at least two cover-slips have tabs colored by different colors.

18. A method of manipulating a cover-slip suitable for use in examination by an optical microscope, comprising:
   providing a cover-slip having a planar portion of substantially rigid and transparent material and a tab adjacent to or contiguous with the planar portion and physically associated with the planar portion, the tab being divertable from the plane of the planar portion along a pre-determined bending region, and
   holding the tab when the tab is diverted from the plane of the planar portion, thereby manipulating the cover-slip;
   wherein the cover-slip further comprises a fracture region between the planar portion and the tab and the tab is diverted by being bent, and the method further comprises:
   disposing the cover-slip in a plate for microbial culturing, whereas the tab is bended towards the opening of the plate;
   disposing the cover-slip on a microscope slide whereas the tab is bended downwards, and
   detaching the tab from the planar portion by controllably breaking the cover-slip along the fracture region.

19. A method of manipulating a cover-slip suitable for use in examination by an optical microscope, comprising:
   providing a cover-slip having a planar portion of substantially rigid and transparent material and a tab adjacent to or contiguous with the planar portion and physically associated with the planar portion, the tab being divertable from the plane of the planar portion along a pre-determined bending region, wherein the cover-slip further comprises a fracture region between the planar portion;
   diverting the tab is diverted by being bent; and
   holding the tab when the tab is diverted from the plane of the planar portion, thereby manipulating the cover-slip.

20. The method of claim 19, further comprising:
   detaching the tab from the planar portion by controllably breaking the cover-slip along the fracture region.

* * * * *